(12) United States Patent
Berde et al.

(10) Patent No.: US 7,826,448 B2
(45) Date of Patent: Nov. 2, 2010

(54) METHOD FOR SETTING UP A CONNECTION BETWEEN PORTIONS OF AN APPLICATION DISTRIBUTED IN NODES CONNECTED TO A COMMUNICATION NETWORK WITH GMPLS CONTROL PLANE

(75) Inventors: Bela Berde, Paris (FR); Dimitri Papadimitriou, Brussels (BE)

(73) Assignee: Alcatel Lucent, Paris (FR)

( * ) Notice: Subject to any disclaimer, the term of this patent is extended or adjusted under 35 U.S.C. 154(b) by 758 days.

(21) Appl. No.: 11/609,325

(22) Filed: Dec. 11, 2006

(65) Prior Publication Data

US 2007/0147427 A1 Jun. 28, 2007

(30) Foreign Application Priority Data

Dec. 12, 2005 (FR) .................................. 05 53831

(51) Int. Cl.
*H04L 12/46* (2006.01)
(52) U.S. Cl. .................... 370/389; 370/392; 370/395.5; 370/401; 709/228
(58) Field of Classification Search ......... 709/227–229, 709/237, 230, 238; 370/397, 395.5, 389, 370/392, 400, 401, 409, 419–420, 352–356, 370/395.2, 395.52
See application file for complete search history.

(56) References Cited

U.S. PATENT DOCUMENTS 6,519,254 B1 * 2/2003 Chuah et al. ................ 370/389

(Continued)

OTHER PUBLICATIONS

Igor Bryskin et al, "Policy-Enabled path Computation Communication requirements; draft-bryskin-pce-policy-enabled-path-comp—00.txt", IETF Standard—Working Draft, Internet Engineering Task Force, IETF, CH, Oct. 2005, XP015042085.

(Continued)

*Primary Examiner*—Pankaj Kumar
*Assistant Examiner*—Duc T Duong
(74) *Attorney, Agent, or Firm*—Carmen Patti Law Group, LLC

(57) ABSTRACT

A method is devoted to setting up a connection between the first (N1) and second (N2) external nodes connected to a GMPLS control plane (RG) and each incorporating a portion (PA1,PA2) of a distributed application and a signalling module (MS1,MS2) loaded to manage the setting up of the connection. This method consists in i) generating in the first external node (N1) a first message requiring the setting up of a connection session and incorporating parameters defining the connection to be set up, then to transmit this first message to the second external node (N2) via the network (RG), ii) analysing the first message in the network (RG) in order to convert the parameters which it contains for the GMPLS control plane and to check their compatibility with other applications resident in the network and with the GMPLS control plane, iii) if they are compatible, transmitting the first message to the second external node (N2), iv) on receipt of the first message in the second external node (N2), determining whether the connection parameters which it contains are supported by its portion of the distributed application (PA2) and/or its signalling module (MS2), and v) if they are supported, transmitting a second confirmation message for setting up the session to the first external node (N1) in order that its signalling module (MS1) shall initiate setting up of the connection.

13 Claims, 1 Drawing Sheet

U.S. PATENT DOCUMENTS

| | | | | |
|---|---|---|---|---|
| 6,907,047 B2* | 6/2005 | Chen et al. | | 370/467 |
| 6,985,480 B2* | 1/2006 | Brown | | 370/352 |
| 6,985,488 B2* | 1/2006 | Pan et al. | | 370/395.3 |
| 7,050,423 B2* | 5/2006 | Schneider et al. | | 370/352 |
| 7,298,973 B2* | 11/2007 | Ovadia et al. | | 398/49 |
| 7,301,951 B2* | 11/2007 | Chen et al. | | 370/395.52 |
| 7,315,897 B1* | 1/2008 | Hardee et al. | | 709/229 |
| 7,372,806 B2* | 5/2008 | Suemura | | 370/223 |
| 7,486,679 B2* | 2/2009 | Vigoureux et al. | | 370/395.21 |
| 2002/0071427 A1* | 6/2002 | Schneider et al. | | 370/352 |
| 2004/0062233 A1* | 4/2004 | Brown | | 370/352 |
| 2005/0063411 A1* | 3/2005 | Wang et al. | | 370/437 |

OTHER PUBLICATIONS

Editors et al,, "Generalized MPLS (GMPLS) RSVP-TE Signaling Extensions in support of Calls; draft-papadimitriou-ccamp-gmpls-rsvp-te-ca 11-00.txt" IETF Standard-Working-Draft, Internet Engineering Task Force, IETF, CH, Nov. 2005, XP015042968.

S. Belotti, Generalized MPLS (GMPLS) RSPV-TE Usage and Extensions for Automatically Switched Optical Network (ASON); IETF Standard-Working-Draft Internet Engineering Task Force, IETF, CH, Jun. 2002, XP01500428.

B. Berde et al, "Improving network performance through policy-based management applied to generalized multi-protocol label switching", ISCC 05, Jun. 27-30, 2005, pp. 739-745 XP002391654.

* cited by examiner

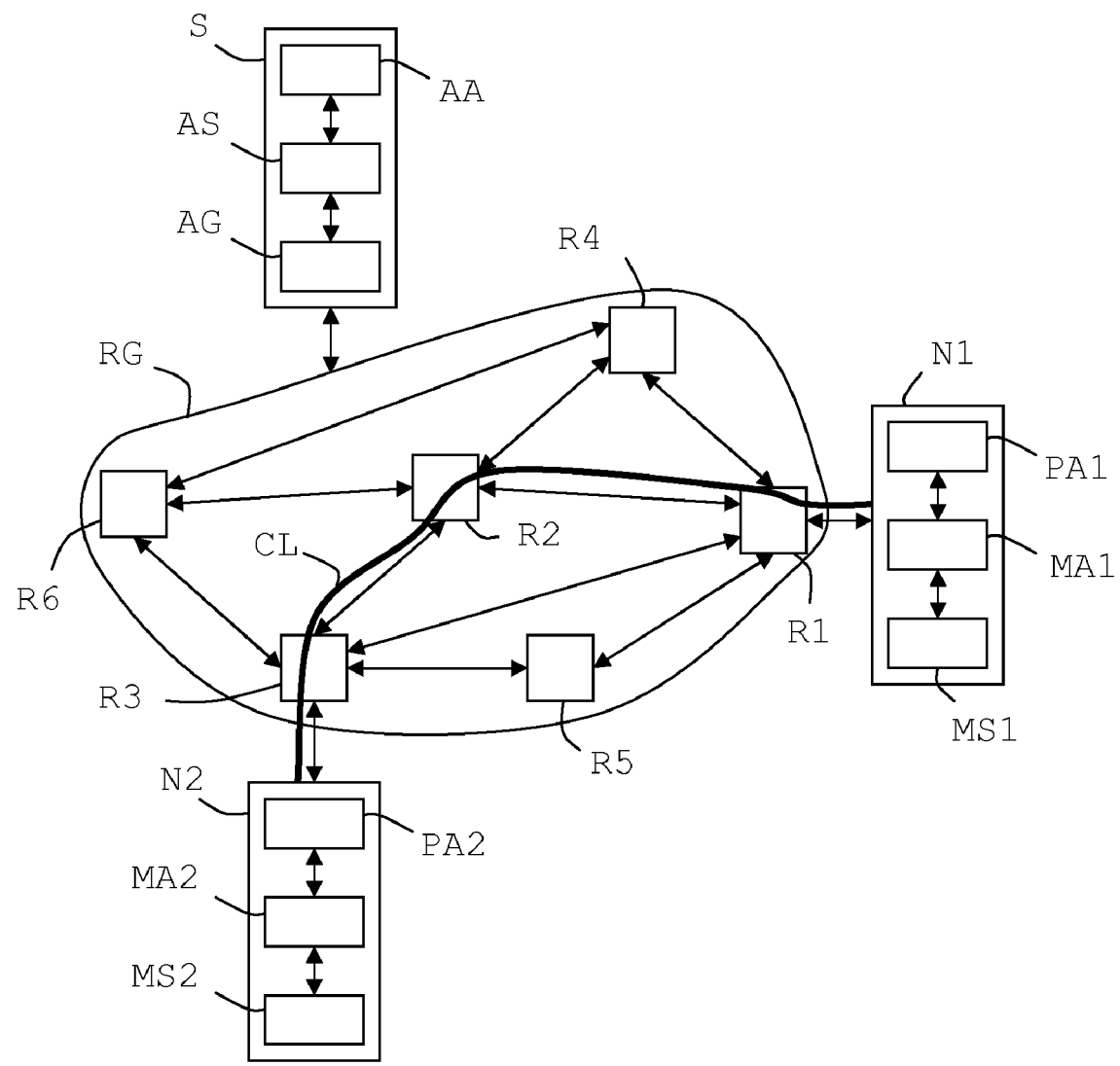
Single figure

METHOD FOR SETTING UP A CONNECTION BETWEEN PORTIONS OF AN APPLICATION DISTRIBUTED IN NODES CONNECTED TO A COMMUNICATION NETWORK WITH GMPLS CONTROL PLANE

BACKGROUND OF THE INVENTION

The invention relates to communication networks with GMPLS control plane, and more precisely to the setting up of a connection between portions of a distributed application between nodes connected to such networks.

By "communication network with GMPLS control plane" is meant a label switched network of the type known as "packet switched" and having a GMPLS (for "Generalized Multi Protocol Label Switching") architecture, such as ATM, Frame Relay (FR), IP and Ethernet networks, or of the type known as "circuit switched" having a GMPLS architecture, such as TDM (such as SONET/SDH, PDH, G.709) networks, wavelength switching networks or spatial switching networks (such as switching from an input port to an output port).

It is recalled that, in a label switched network, the connection paths which are set up between nodes (or "hosts") are called LSPs (for "Label Switched Paths").

Because of the trend to integration and distribution of information systems, the quantity of data which is transported by networks, be it on demand or in an organised way, is growing more rapidly than the quantity of data which can be acquired and processed by so-called centralised applications. Accordingly, networks must increasingly become collaborative media for exchanging data and have a core of high level services supported by access suppliers, while at the same time providing basic bandwidth and connectivity services.

These high level services cater for applications which use distributed resources, such as GRID, e-Science, e-Government, IPTV (for "Internet Protocol TeleVision") or VoD (for "Video on Demand"). Such applications, called hereafter "distributed applications" because they incorporate at least two portions installed in the nodes connected to the network, require a co-operative and adaptive service(s) control plane, based on the Internet protocol (IP), such as the GMPLS control plane.

In order that application portions might operate in parallel, they must be interconnected, by means of a connection path with Quality of Service (or QoS), of the LSP type. In order to set up such a connection, the nodes in which the portions of a distributed application are installed must communicate their needs in terms of network resources. In order to do this, they use, for example, the resources reservation protocol, or RSVP, and more specifically RSVP messages of the "path message" and "Resv message" types. As these nodes are external to the network, although connected to the latter, RSVP messages are exchanged directly, without the network being able to control this exchange. However, the majority of carriers forbid the direct reservation of resources by user nodes (external their networks) as this interrupts their internal resource reservation mechanism.

SUMMARY OF THE INVENTION

The aim of the invention is therefore to remedy the aforementioned drawback by allowing a reservation of resources, within a communication network with GMPLS control plane, initiated by external nodes (each incorporating a portion of a distributed application and a signalling module configured to manage the setting up of connections).

It proposes a consistent method for this purpose, in case there is a need to set up a connection between the first and second external nodes:

i) to generate in the first external node a first message requiring the setting up of a connection session and incorporating parameters defining a connection to be set up, then to transmit this first message addressed to the second external node, via the network and by means of a communication service session protocol, ii) to analyse the first message in a chosen spot on the network in order to convert the parameters which it contains for the GMPLS control plane and to check their compatibility with other applications resident in the network and with the GMPLS control plane, iii) then to send the first message in the network, by means of a communication service session protocol, so as to transfer it to the second external node, iv) on receipt of the first message in the second external node to determine whether the connection parameters which it contains are supported by its distributed application portion and/or its signalling module, and v) if they are supported, to transmit a second confirmation message for setting up a session in the first external node, by means of a communication service session protocol, in order that its signalling module initiates setting up of the connection.

The method according to the invention can incorporate other characteristics which can be taken separately or in combination, and in particular:

before transmitting the first message, the portion of the distributed application from the first external node can transmit the connection parameters to a service adaptation module which it includes in order that it shall check with the signalling module whether it supports these connection parameters. The first message (session request) is then generated and it is transmitted by means of the communication service session protocol if the connection parameters are supported by the signalling module and by the other applications resident in the network;

at step ii) the first message from the communication service session can be analysed by means of a resource reservation control equipment, coupled to the network in at least one chosen spot. This control equipment includes a service adaptation agent module, an application agent module, capable of replacing the portion of the distributed application from the second external node, and a GMPLS agent module capable of communicating with the GMPLS control plane. The role of the service adaptation module is to convert the connection parameters contained in each first message analysed in order to check with the application agent module whether they are compatible with the other applications resident in the network and to check with the GMPLS agent module whether they are compatible with the GMPLS control plane. If they are compatible, the service adaptation module then, at step iii), sends the first message in the communication service session to the chosen spot;

this chosen spot is, for example, a network switching node to which the first external node is connected and which provides the input point;

at step iv) the second node can receive the first message via the communication service session protocol. A service adaptation module which it includes then transmits to its portion of the distributed application and/or its signalling module in order that they shall determine whether the connection parameters which it contains are supported. If they are supported, the communication service session can then convey the second message to the first external node;

at step v) the first external node can receive the second message transmitted to its service adaptation module in order that it shall direct the signalling module to initiate the setting up of the connection.

The invention also proposes a resource reservation control equipment for a communication network with a GMPLS control plane to which are connected external nodes, each incorporating a portion of a distributed application and a signalling module configured to manage the setting up of connections.

This equipment is characterised by the fact that its task is first to analyse in at least one chosen spot on the network each first message (or session request), transmitted by a first external node to a second external node by a communication service session and incorporating parameters defining a connection to be set up, in order to convert its parameters for the GMPLS control plane and to check their compatibility with the other applications resident in the network and with the GMPLS control plane; and second, if they are compatible, to send the first message into the network (at the same time continuing the communication service session) in order to transmit it to the second external node.

The equipment according to the invention can incorporate other characteristics which can be taken separately or in combination, and in particular:

it can include, first, an application agent module whose task is to replace the portion of the distributed application from the second external node and second a GMPLS agent module whose task is to communicate with the GMPLS control plane, and third, a service adaptation agent module whose task is to convert the parameters contained in each first message from the network for the GMPLS control plane and to check with the application agent module and with the GMPLS agent module whether the parameters which it contains are compatible with the applications resident in the network and to check with the GMPLS control plane respectively, and to send the first message into the network to the chosen spot if they are compatible;

it can for example be installed in one of the network's peripheral switching nodes in order to function in centralised mode;

as a variation, it can for example be coupled to each of the network's peripheral switching nodes.

The invention also proposes an external node (or host) intended to be connected to a communication network with GMPLS control plane and incorporating a portion of a distributed application and a signalling module whose task is setting up connections with at least one other external node incorporating another portion of the distributed application and a signalling module.

This external node is characterised by the fact that it includes a service adaptation module whose task is, when it receives parameters defining a connection to be set up with another external node and originating from the portion of the (local) distributed application, to check with the signalling module whether it supports the connection parameters and, if they are supported, to generate a first premier message requiring the setting up of a communication service session and incorporating the parameters defining the connection to be set up, in order that it should be transmitted by means of a communication service session protocol addressed to the other external node.

Moreover, if a first message is received, the service adaptation module can determine whether the connection parameters which it contains are supported by its portion of the (local) distributed application and/or its signalling module, then, if they are supported, to generate a second confirmation message for setting up the connection session in order that it should be transmitted by means of the communication service session protocol addressed to the external node which transmitted the first message, in order that its signalling module shall initiate the setting up of the connection which was the subject of the first message.

In addition, if a second message is received, responding to a previous message, the service adaptation module can direct the signalling module to initiate the setting up of the connection which was the subject of the first and second messages.

BRIEF DESCRIPTION OF THE DRAWINGS

Other characteristics and advantages of the invention will become apparent on examination of the detailed description which follows, and from the attached drawing, on which the single FIGURE illustrates very schematically a communication network with GMPLS control plane including a resource reservation control equipment according to the invention and to which are connected external nodes (or hosts) according to the invention. The attached drawing not only complements the invention, but also contributes to its definition, if applicable.

DETAILED DESCRIPTION OF THE INVENTION

The object of the invention is to allow external nodes, which are connected to a communication network with GMPLS control plane, to reserve network resources in order to set up an interconnection, under control of the network.

In the description that follows, we shall consider, to give but one example, that the communication network with GMPLS control plane is a label switched network of the "packet switched" or "connection oriented" type and having a GMPLS architecture, such as an ATM, Frame Relay (FR), IP or Ethernet network. However, the invention is not limited to packet switched networks. It relates also to label switched networks of the "circuit switched" or "non-packet" type having a GMPLS architecture, such as TDM (such as SONET/SDH, PDH, G.709) networks, wavelength switching networks or spatial switching networks (such as switching from an input port of an output port).

As is schematically illustrated in the FIGURE, a network with GMPLS control plane (hereafter referred to as "GMPLS network"—RG) generally incorporates a multiplicity of network elements defining internal nodes Ri, such as switches or label switched routers (or LSRs) coupled together.

These internal Ri nodes can be grouped in two categories: peripheral nodes (such as "Label Edge Routers"), and core nodes (such as "Label Core Routers"). The task of peripheral nodes is to set up connection paths (also called Label Switched Paths, or LSPs) within the network RG, whereas the core nodes (in this case R2) deal with the switching.

In the illustrated example, although there are other possibilities, the network includes six internal nodes (i=1 to 6, R1 to R6) of which five are peripheral (R1 and R3 to R6) and one core (R2). However, the number i can take on any value $\geq 2$.

Moreover, in what follows "connection path" indicates a route between a first peripheral internal node (for example R1), constituting an input point for a first external node (or host) N1, and a second peripheral internal node (for example R3), constituting an input point for a second external node (or host) N2, defined by a sequence of links set up between two neighbouring nodes or, which amounts to the same thing, defined by a directed suite of internal nodes Ri. In a GMPLS network, each peripheral internal node is configured, if it constitutes a source, so as to calculate the best connection path to transfer the data flows which it receives towards the recipient peripheral internal node, given the service related to the flows, the current network topology and the loads during the links.

In the illustrated example, only the two external nodes Nj (j=1 or 2) have been represented, but many more nodes can be connected to the GMPLS RG network. These external nodes Ni can be user or corporate terminals, belonging to network customers.

Each external node Nj includes a portion PAj of a distributed application and a signalling module MSj, whose task is to generate the setting up of a connection with at least one other node Nj' incorporating another portion PAj' of the distributed application. For example, each signalling module MSj is of the GMPLS type. However, this is not essential, the important thing being that the signalling module MSj should be capable of setting up a connection (or a flow, or even a circuit) in the GMPLS RG network.

The setting up of a connection (in this case of the LSP type) is intended to allow the portions PA1 and PA2 of the distributed application, installed in the external nodes N1 and N2 respectively, to exchange data with each other.

The invention acts in the connection setting up phase and, more precisely, it acts upstream of the connection setting up phase in order to make it possible (i.e. with the agreement of the GMPLS RG network).

The invention proposes a method for determining whether a connection (in this case of the LSP type) can be set up, via the GMPLS RG network, between the first external node N1 and the second external node N2. This method comprises at least the five steps described hereafter.

The first step commences when the first portion PA1 of the distributed application, installed in the first external node N1, wishes to exchange data with the second portion (complementary) PA2 of this same distributed application, installed in the second external node N2. This exchange needs a connection defined by a set of parameters, such as the minimum bandwidth or transmission time.

These parameters are integrated, in the first node N1, in a first message requiring the setting up of a connection session.

For example, and as illustrated, each external node Nj includes a service adaptation module MAj coupled to its signalling module MSj and its portion Paj of the distributed application. This service adaptation module MAj receives the connection parameters defined by the portion PAj of the distributed application and transmits them to the signalling module MSj in order for it to check that it can support them.

If this is not the case, the signalling module MSj signals this to the service adaptation module MAj in order for it to warn the portion Paj of the distributed application. The connection, therefore, cannot be initiated.

If the connection parameters are supported, the signalling module MSj signals this to the service adaptation module MAj.

The latter then generates a first message including the connection parameters, then it prompts a communication service session to transmit it, by means of a communication service session protocol, from the first external node N1 to the second external node N2, via the GMPLS RG network. The first message enters the GMPLS RG network at the internal node R1.

The second step consists in detecting and analysing the first message in a spot chosen by the GMPLS RG network in order to check the compatibility of the connection parameters which it contains with the GMPLS control plane and with the applications resident in the network.

In order to do this, the GMPLS RG network can for example include a resource reservation control equipment S, for example implemented in the form of a server. This server S can either be centralised, as is the case in the FIGURE illustration, or distributed. If the server S is centralised, it is coupled to certain internal nodes Ri, for example peripheral internal nodes, and its task is to observe all the traffic which transits through them in order to detect each first message from the communication service session. If the server S is distributed, it is installed in certain internal nodes Ri, for example peripheral internal nodes, and its task is to observe all the traffic which transits through its internal node in order to detect each first message that it receives from the communication service session.

There is no need for the external nodes Nj to be aware that there is a control server S.

When the server S detects a first message, it analyses the connection parameters which it contains in order to confirm their compatibility with the GMPLS control plane and with the applications resident in the network.

In order to do this, the server S includes, for example, an application agent module AA, a GMPLS agent module AG and a service adaptation agent module AS.

The task of the service adaptation agent module AS is to convert for the GMPLS control plane the connection parameters which are contained in each first message that has reached at least one spot chosen by the GMPLS RG network and to communicate these connection parameters to the application agent module AA and to the GMPLS agent module AG, in order that they shall confirm whether they are compatible with the applications resident in the network and with the GMPLS control plane respectively. There is accordingly a layer placed above the GMPLS control plane layer.

The role of the application agent module AA is to replace the portion PA1 of the distributed application from the second internal node N2. This is a layer placed above the layer to which the service adaptation agent module AS belongs. When it receives the connection parameters from the service adaptation agent module AS, the application agent module AA checks whether they are compatible with the applications which are resident in the network.

The task of the GMPLS agent module is to communicate with the GMPLS control plane. There is accordingly a layer placed at the level of the GMPLS control plane layer. When the GMPLS agent module receives the connection parameters from the service adaptation agent module AS, it determines whether the resources that must be reserved to set up the connection defined by these parameters are compatible with the internal resource reservation mechanism of the GMPLS RG network, which is managed by the GMPLS control plane.

If the application agent module AA and/or the GMPLS agent module AG signal(s) to the service adaptation agent module AS that the connection cannot be set up, then the connection cannot be permitted. The first message is not resent in the GMPLS RG network. A message can then be sent by the server S to the first external node N1, by means of the communication service session protocol, in order to warn it of the ban on setting up the connection.

If the application agent module AA and the GMPLS agent module AG signal to the service adaptation agent module AS that the connection can be set up, then the service adaptation agent module AS sends the first message into the GMPLS RG network to the spot where it extracted it, in order that it shall continue the current communication service session and thus repeat its path to its initial destination (the second external node N2). This sending constitutes the third step of the method according to the invention.

The fourth step begins when the second external node N2 receives the first message via the communication service session protocol. It consists of determining whether the connection parameters which are contained in this first message are supported by the second PA2 of the distributed application and/or by the signalling module MS2.

For example, the service adaptation module MA2 from the second external node N2 receives the first message and communicates the connection parameters which it contains to the second portion PA2 of the distributed application and to the signalling module MS2 in order that they shall confirm whether they can support them.

If the second portion PA2 of the distributed application and/or the signalling module MS2 signal(s) to the service adaptation module MA2 that it/they cannot support the required connection, then the service adaptation module MA2 generates a second message signalling that it is impossible to set up the connection. The service adaptation module MA2 then directs its second external node N2 to transmit it to the first external node N1, via the GMPLS RG network and via the communication service session protocol. On receipt of the second message, the service adaptation module MA1 from the first external node N1 warns the first portion PA1 of the distributed application that it is impossible to set up the connection that it has requested.

If the second portion PA2 of the distributed application and the signalling module MS2 signal to the service adaptation module MA2 that they can support the required connection, then the service adaptation module MA2 generates a second message signalling that the connection can be set up. The service adaptation module MA2 then directs its second external node N2 to transmit it to the first external node N1, via the GMPLS RG network and via the communication service session protocol. On receipt of the second message, the service adaptation module MA1 from the first external node N1 directs the signalling module MS1 to set up the connection requested by the first portion PA1 of the distributed application and defined by the connection parameters communicated previously.

In either of these situations, the generation of a second message and its transmission constitutes the fifth step of the method according to the invention.

Once the signalling module MS1 is authorised to set up the connection, the mechanism for setting up this connection is completely conventional. Once the GMPLS RG network has authorised the connection, it no longer plays any part in the connection set up phase. As this mechanism is familiar to the man skilled in the art, it will not be described here. We shall confine ourselves to noting that it is done by means of the RSVP protocol, first of all by sending a message of the "RSVP-TE path message" type from the signalling module MS1 of the first external node N1 to the signalling module MS2 of the second external node N2, via the GMPLS RG network and, more precisely, the internal nodes of the "future" connection path (LSP), in this case R1 to R3, in order to reserve resources in each node, then by sending a message of the "RSVP-TE Resv message" type from the signalling module MS2 of the second external node N2 to the signalling module MS1 of the first external node N1, via the GMPLS RG network and, more precisely, the internal nodes of the "future" connection path (LSP), in this case R3 to R1, in order to confirm that the resources have in fact been reserved in each node.

Once the signalling module MS1 of the first external node N1 has received the message of the "RSVP-TE Resv message" type, containing all the general parameters characterising the connection path (LSP) set up with the internal nodes constituting it, it warns the first portion PA1 of the distributed application. We will recall that a message of the "RSVP-TE Resv message" type includes namely an object termed "ADSPEC" defined by the standardised RFC 2210 rule, and that the general parameters which are defined in the ADSPEC object are defined by the standardised RFC 2215 rule (number of hops, estimated bandwidth, minimum transmission time over the path and the composed MTU). Once the authorisation is received, the first portion PA1 of the distributed application can start to exchange data with the second complementary portion PA2 installed in the second external node N2.

Preferably, once the connection path (LSP) has been set up by means of the RSVP-TE protocol, the service adaptation module MA1 from the first external node N1 transmits periodically a reservation refreshment message, for example of the same type as a first message, addressed to the service adaptation module MA2 of the second external node N2. Likewise, the service adaptation module MA2 of the second external node N2 transmits periodically a reservation refreshment message, for example of the same type as a second message, addressed to the service adaptation module MA1 of the first external node N1.

The service adaptation modules MAj, the signalling modules MSj, the portions Paj of the distributed application, the application agent module(s) AA, the GMPLS agent module(s) AG and the service adaptation module(s) AS, can be implemented as electronic circuits, software (or computer) modules, or a combination of circuits and software.

The invention is not limited to modes of implementing the method for setting up a connection, control and external node equipment described above, simply by way of example, but it encompasses all the variations which the man skilled in the art could consider in the claims hereafter.

The invention claimed is:

1. Method for setting up a connection between external nodes (Nj) connected to a communication network with Generalized Multiprotocol Label Switching (GMPLS) control plane (RG) and each comprising a portion (PAj) of a distributed application and a signaling module (MSj) configured to manage the setting up of connections, comprising the steps of:

i) when a connection between a first (N1) and a second (N2) external nodes must be set up, generating in the first external node (N1), by means of a communication service session protocol, a first message requesting the setting up of a connection session and comprising parameters defining a connection to be set up, then transmitting the first message from the first external node towards the second external node (N2), via said network (RG), ii) in a point of said network (RG), detecting each such first message in a communication service session and analyzing the first message in order to convert the parameters which it contains for the GMPLS control plane and to check their compatibility with another application resident in the network and with the GMPLS control plane, iii) if the parameters are compatible, sending said first message in said network (RG) from said point of said network, by means of the communication service session protocol, transmitting it to said second external node (N2), iv) on receipt of said first message in said second external node (N2), determining at the second external node whether the connection parameters which it contains are supported by at least one of the portion of the distributed application (PA2) of the second external node and the signaling module (MS2) of the second external node, and v) if the connection parameters are supported, transmitting from the second external node a second message for authorizing the setting up of a session, to said first external node (N1), via said network by means of the communication service session protocol, in order that the signaling module (MS1) of the first external node shall initiate the setting up of said connection.

2. Method according to claim 1, wherein before proceeding with the transmission of said first message, said portion of the distributed application (PA1) from the first external node (N1) transmits said connection parameters to a service adaptation module (MA1) which the service adaption module includes in order that the service adaption module shall check with the signaling module (MS1) whether the signaling module supports said connection parameters, and if the connection parameters are supported, said first message is generated with said service adaptation module (MA1) from the first external node (N1) and is transmitted by means of the communication service session protocol.

3. Method according to claim 1, wherein ii) analyzing said first message from the communication service session by means of a resource reservation control equipment (S) coupled to said network (RG) in at least one point and including an application agent module (AA) replacing the portion of the distributed application (PA2) from the second external node (N2), a GMPLS agent module (AG) capable of communicating with said GMPLS control plane, and a service adaptation agent module (AA) configured to convert the connection parameters contained in each first message for the GMPLS control plane and to check with said application agent modules (AA) and the GMPLS agent module (AG) whether the parameters contained in each first message are compatible with the other applications resident in the network (RG) and with said GMPLS control plane respectively, and by iii) said application agent module (AA) proceeding with the sending of said first message in said network (RG) to said point in case of compatibility.

4. Method according to claim 3, wherein said point is switching node (R1) of the network (RG) to which said first external node (N1) is connected and which provides the input point.

5. Method according to claim 1, wherein iv) said second external node (N2) receiving said first message via the communication service session protocol and sending it to a service adaptation module (MA2) which it includes, in order that it shall determine whether the connection parameters which it contains are supported by the at least one of its portion of the distributed application (PA2) and its signaling module (MS2), and by v) said service adaptation module (MA2) from said second external node (N2) generating said second message if said parameters are supported by the at least one portion of the distributed application (PA2) and the signaling module (MS2) of said second external node (N2), in order that the second message should be transmitted by the communication service session to said first external node (N1).

6. Method according to claim 2, wherein v) said first external node (N1) receiving said second message transmitted to its service adaptation module (MA1) and directing its signaling module (MS1) to initiate the setting up of said connection.

7. Resource reservation control equipment (S) for a communication network with Generalized Multiprotocol Label Switching (GMPLS) control plane (RG), to which are connected external nodes (Nj) each comprising a portion (PAj) of a distributed application and a signaling module (MSj) configured to manage the setting up of connections, the resource reservation control equipment comprising i) means for detecting and analyzing in at least one point of said network (RG) a first message, transmitted by a first external node (N1) to a second external node (N2) by a communication service session, said message requiring the setting up of a connection session and comprising parameters defining a connection to be set up, for converting the message parameters for the GMPLS control plane, and for checking the compatibility of the parameters with another application resident in said network (RG) and with said GMPLS control plane, and ii) means for sending said first message in said network to said second external node (N2) while continuing the communication service session.

8. The equipment according to claim 7, further comprising i) an application agent module (AA) configured to replace the portion of the distributed application (PA2) from said second, external node (N2), ii) a GMPLS agent module (AG) configured to communicate with said GMPLS control plane, and iii) a service adaptation agent module (AS) configured to convert for the GMPLS control plane the parameters contained in each first message, in order to check with said application agent module (AA) and said GMPLS agent module (AG) whether said parameters are compatible with the applications resident in the network and with the GMPLS control plane respectively, and to send said first message in said network (RG) to said point in case of compatibility.

9. The equipment according to claim 7, wherein the equipment is installed in a peripheral switching node (R1) of said network (RG).

10. The equipment according to claim 7, wherein the equipment is coupled to each peripheral switching node (R1, R3-R6) of said network (RG).

11. External node (Nj) capable of being connected to a communication network with Generalized Multiprotocol Label Switching (GMPLS) control plane (RG) and comprising a portion of a distributed application (PAj) and a signaling module (MSj) configured to manage the setting up of connections with at least one other external node (Nj') comprising another portion (PAj') of said distributed application and a signaling module (MSj'), wherein a service adaptation module (MAj) configured, if parameters are received defining a connection to be set up with said other external node (Nj') and originating from said portion of the distributed application (PAj), in order to check with said signaling module (MSj) whether the signaling module supports said connection parameters, and if the connection parameters are supported, to generate addressed to said other external node (Nj') a first message requiring the setting up of a connection session and including said parameters defining the connection to be set up, in order that it should be transmitted by means of a communication service session protocol addressed to the other external node (Nj').

12. The external node according to claim 11, wherein: if a first message is received, a service adaptation module (MAj') is configured to determine whether the connection parameters which the first message contains are supported by at least one of the distributed application (PAj') and signaling module (MSj'), then, if the at least one application portion and module is supported, to generate and transmit a second confirmation message, for authorizing the setting up of a session, and addressed to the external node (Nj) having transmitted said first message, in order that signaling module (MSj) initiates the setting up of the connection associated with said first message.

13. The external node according to claim 12, wherein: if a second message is received, responding to a first message transmitted previously, said service adaptation module (MAj) is configured to direct said signaling module (MSj) to initiate the setting up of the connection which was the subject of said first and second messages.

* * * * *